United States Patent
Cho

(10) Patent No.: US 7,937,434 B2
(45) Date of Patent: *May 3, 2011

(54) APPARATUS AND METHOD FOR PROVIDING CONTEXT-AWARE SERVICE

(75) Inventor: Yong-jin Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 733 days.

This patent is subject to a terminal disclaimer.

(21) Appl. No.: 11/189,079

(22) Filed: Jul. 26, 2005

(65) Prior Publication Data

US 2006/0020633 A1    Jan. 26, 2006

Related U.S. Application Data

(60) Provisional application No. 60/590,908, filed on Jul. 26, 2004.

(30) Foreign Application Priority Data

Jul. 28, 2004   (KR) .................. 10-2004-0059344

(51) Int. Cl.
*G06F 15/16* (2006.01)
*G06Q 20/00* (2006.01)

(52) U.S. Cl. ........................ 709/203; 705/64

(58) Field of Classification Search ................ None
See application file for complete search history.

(56) References Cited

U.S. PATENT DOCUMENTS

| | | | |
|---|---|---|---|
| 5,878,406 A * | 3/1999 | Noyes | 706/55 |
| 6,640,244 B1 * | 10/2003 | Bowman-Amuah | 709/207 |
| 6,640,249 B1 * | 10/2003 | Bowman-Amuah | 709/228 |
| 6,715,145 B1 * | 3/2004 | Bowman-Amuah | 718/101 |
| 6,732,293 B1 * | 5/2004 | Schneider | 714/15 |
| 6,742,015 B1 * | 5/2004 | Bowman-Amuah | 718/101 |
| 6,954,220 B1 * | 10/2005 | Bowman-Amuah | 715/741 |
| 7,054,614 B1 * | 5/2006 | Hunzinger | 455/411 |
| 7,206,805 B1 * | 4/2007 | McLaughlin, Jr. | 709/203 |
| 7,289,964 B1 * | 10/2007 | Bowman-Amuah | 705/1 |
| 7,290,056 B1 * | 10/2007 | McLaughlin, Jr. | 709/230 |
| 7,725,532 B2 * | 5/2010 | Jeon et al. | 709/203 |

(Continued)

FOREIGN PATENT DOCUMENTS

CN    1410914 A    4/2003

(Continued)

OTHER PUBLICATIONS

Tao Gu, Xiao Hang Wang, Hung Keng Pung and Da Qing Zhang, "A Middleware for Context-Aware Mobile Services," 2 pg.

(Continued)

*Primary Examiner* — Neveen Abel-Jalil
*Assistant Examiner* — Tarek Chbouki
(74) *Attorney, Agent, or Firm* — Sughrue Mion, PLLC

(57) ABSTRACT

An apparatus and method for providing a context-aware service are provided. The apparatus includes a context-aware service object (CAS) management module managing information on a CAS and a context defined by the CAS, a sensor management module managing information on a sensor and requesting the sensor to observe knowledge, and a context management module informing the CAS management module of a CAS defining a context provided by the CAS management module when observed knowledge satisfies the context defined by the CAS, wherein upon being informed of the CAS by the context management module, the CAS management module requests the CAS to provide a service.

12 Claims, 10 Drawing Sheets

U.S. PATENT DOCUMENTS

| | | | |
|---|---|---|---|
| 2002/0095399 A1* | 7/2002 | Devine et al. | 707/1 |
| 2002/0165726 A1* | 11/2002 | Grundfest | 705/1 |
| 2003/0065501 A1 | 4/2003 | Hamdan | |
| 2003/0126136 A1* | 7/2003 | Omoigui | 707/10 |
| 2003/0172002 A1* | 9/2003 | Spira et al. | 705/27 |
| 2004/0024768 A1 | 2/2004 | Haller | |
| 2004/0167881 A1* | 8/2004 | Masuda | 707/3 |
| 2004/0225629 A1* | 11/2004 | Eder | 706/46 |
| 2005/0010871 A1* | 1/2005 | Ruthfield et al. | 715/712 |
| 2005/0021713 A1* | 1/2005 | Dugan et al. | 709/223 |
| 2005/0108418 A1* | 5/2005 | Bedi et al. | 709/232 |
| 2005/0138640 A1* | 6/2005 | Fresko | 719/318 |
| 2005/0198612 A1* | 9/2005 | Gonzalez | 717/101 |
| 2005/0204047 A1* | 9/2005 | Mitchell et al. | 709/228 |
| 2006/0031282 A1* | 2/2006 | Tuttle et al. | 709/203 |
| 2006/0064500 A1* | 3/2006 | Roth et al. | 709/231 |
| 2006/0238333 A1* | 10/2006 | Welch et al. | 340/539.12 |
| 2007/0050340 A1* | 3/2007 | von Kaenel et al. | 707/3 |
| 2007/0239822 A1* | 10/2007 | Tuttle et al. | 709/203 |
| 2007/0250841 A1* | 10/2007 | Scahill et al. | 719/320 |
| 2009/0089254 A1* | 4/2009 | Von Kaenel et al. | 707/3 |

FOREIGN PATENT DOCUMENTS

| | | |
|---|---|---|
| CN | 1419774 A | 5/2003 |
| JP | 2001-145174 A | 5/2001 |
| KR | 10-2004-0005247 A | 1/2004 |

OTHER PUBLICATIONS

Marco Mamei, Franco Zambonelli and Letizia Leonardi, "Tuples On The Air: a Middleware for Context-Aware Computing in Dynamic Networks," pp. 1-9.

* cited by examiner

FIG. 12

[Application]
Name=SamAirCon

[CAS]
Name=SamCAS1
When-Context=Warm
Why-Context=not Cooling
Action=Cooling

[CAS]
Name=SamCAS2
When-Context=Temperature > 25
Why-Context=not Warm
Action=Warm

[Sensor]
Name=SamSensor1
Observation=Temperature

APPARATUS AND METHOD FOR PROVIDING CONTEXT-AWARE SERVICE

CROSS-REFERENCE TO RELATED APPLICATIONS

This application claims priority from Korean Patent Application No. 10-2004-0059344, filed on Jul. 28, 2004 in the Korean Intellectual Property Office, and U.S. Patent Application No. 60/590,908, filed on Jul. 26, 2004 in the United States Patent and Trademark Office, the entire disclosures of which are incorporated herein by reference.

BACKGROUND OF THE INVENTION

1. Field of the Invention

The present invention relates to an apparatus and method for providing a context-aware service, and more particularly, to an apparatus and method for providing an adaptive service according to a dynamically changing context by providing a context-aware service framework in which the content of a service is determined by knowledge.

2. Description of the Related Art

Main middleware supporting application software is object-oriented middleware. In conventional object-oriented middleware, a client object acquires an interface for using a service from a server object and uses the server object through the acquired interface.

FIG. 1 illustrates the concept of a conventional representative object-oriented middleware, i.e., a common object request broker architecture (CORBA).

The CORBA is the structure and standard for generating, distributing, and managing distributed program objects on a network and allows programs, which are located at different positions and developed by different vendors, to communicate with each other through an interface broker. Normal object-oriented middleware including CORBA includes an object request broker (ORB) 130 which passes a request from a client object 110 to a server object 120. The ORB 130 is an agent that accomplishes a client-server relationship between objects. When the ORB 130 is used, the client object 110 can clearly call a method located in the server object 120 regardless of whether the method is in one computer or on a network. The ORB 130 intercepts a call of the client object 110 for the server object 120, finds an object which will process a request, transmits a parameter to the found object, calls a method, and returns a processing result back to the client object 110. The client object 110 does not need to know about a location of the server object 120, the program language and operating system which are used, or any other system related facts except for the interface of the server object 120.

As described above, in conventional object-oriented middleware, a server object provides an interface function of a service that it provides. A client object acquires the interface of the server object and directly calls the interface so that the server object provides the service. Accordingly, the client object and the server object have a strong connection therebetween, which is not suitable to a dynamically changing operating environment. Therefore, a middleware providing a service which may be adaptively changed according to a dynamically changing situation is desired.

SUMMARY OF THE INVENTION

The present invention provides a method of constructing an system which is adaptive to a dynamically changing situation by loosely connecting a client object to a server object through the medium of context.

The present invention also provides a method of allowing a plurality of client objects to share a server object by using a context.

The present invention also provides a method of allowing a plurality of server objects to share a client object by allowing the server objects to share knowledge provided by the client object.

The present invention also provides a method of providing a unified interface between a client object and a server object.

The above and other aspects of the present invention will become clear to those skilled in the art upon review of the following description.

According to an aspect of the present invention, there is provided an apparatus for providing a context-aware service, including a context-aware service object (CAS) management module registering, managing, and removing information on a CAS and a context defined by the CAS; a sensor management module registering, managing, and removing information on a sensor, which observes knowledge needed to examine a context, and requesting the sensor to observe the knowledge; and a context management module managing observed knowledge and informing the CAS management module of a CAS defining a context provided by the CAS management module when the observed knowledge satisfies the context defined by the CAS.

According to an aspect of the present invention, there is provided a method of providing a context-aware service, the method including registering information on a context-aware service object (CAS) and a context defined by the CAS, registering information on a sensor, receiving knowledge observed by the sensor based on the information on the sensor, informing of the CAS defining the context when the knowledge satisfies the context, and requesting the CAS to provide a service.

According to an aspect of the present invention, there is provided a method of providing a context-aware service, the method including receiving a registration request from a sensor, registering information on the sensor in response to the registration request, when knowledge observed by the sensor is needed, requesting the sensor to observe the knowledge, receiving a removal request from the sensor, and deleting the information on the sensor in response to the removal request.

According to an aspect of the present invention, there is provided a method of providing a context-aware service, the method including receiving a registration request from a context-aware service object (CAS), registering information on the CAS and a context provided by the CAS in response to the registration request, when a sensor necessary to determine the context has been registered, examining whether knowledge provided by the sensor satisfies the context, receiving a removal request from the CAS, and deleting the information on the CAS and the context in response to the removal request.

BRIEF DESCRIPTION OF THE DRAWINGS

The above and other aspects of the present invention will become more apparent by describing in detail exemplary embodiments thereof with reference to the attached drawings in which:

FIG. 12 illustrates an example of a source code for implementing a context-aware service framework.

DETAILED DESCRIPTION OF THE EXEMPLARY EMBODIMENTS

Figure 1:
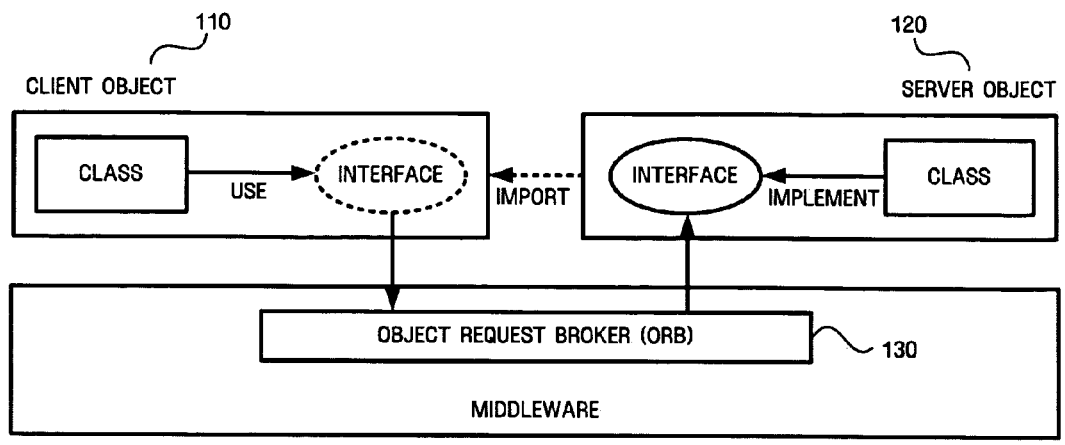
FIG. 1 illustrates the concept of a conventional object-oriented middleware.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Before setting forth the exemplary embodiments of the invention, terms used in this specification will be briefly explained. It is to be understood that the following explanation of the terms are provided for a better understanding of the invention and are not limiting of the invention.

Context refers to information that determines a service action defined by a context-aware service object (referred to as a CAS). The information determining a service action may include a time when a service is provided, information on whether to provide the service, an object to which the service is provided, a position to which the service is provided, etc. According to the characteristic of a service action determined by the context, the context is divided into a when-context determining a time when a service is provided, a why-context determining whether to provide a service, and a how-context determining the content of a service. In a context-aware service, a service corresponding to the how-context is provided when the why-context is satisfied the moment the when-context is satisfied. As will be described with reference to FIG. 2 later, the context is examined based on knowledge provided by a client object and is determined by a context-aware service framework.

Knowledge refers to all information that can characterize an entity situation. An entity is a person, a place, or a thing that is considered as being involved in the interaction between a user and an application program and includes the user and the application program. The knowledge may be a value such as temperature or humidity measured by a physical sensor and may be extended to general information, such as information on arrival/non-arrival of e-mail or Internet information. Accordingly, all service software may be referred to a context-aware service.

Context-aware service refers to a service the provision and content of which vary with a context defined by a service object. When it is determined based on knowledge provided by a client that a why-context is satisfied the moment a when-context is satisfied, a service is provided based on a how-context. Accordingly, knowledge and context requested by a service may vary with an operating environment or a user's taste. For example, there may be a context-aware service having a context "Start an air conditioner when temperature is not lower than 25°", a context "temperature is not lower than 25°" may be changed into "temperature is not lower than 28°", "temperature is not lower than 25° and humidity is not less than 80%", or the like, according to a user's preference.

Figure 2:
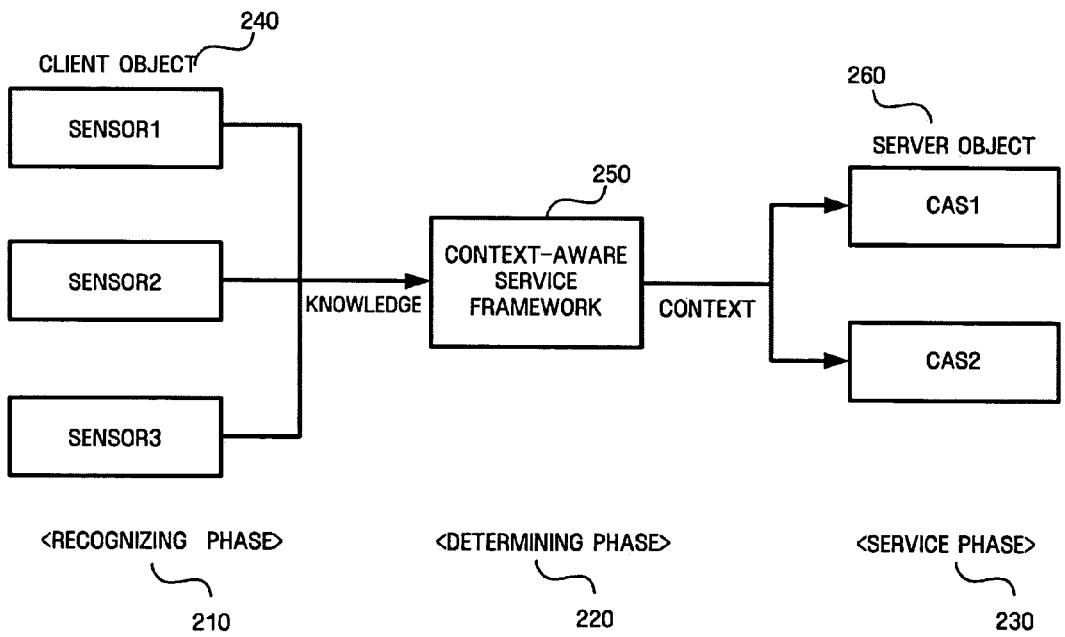
FIG. 2 illustrates the outline of a context-aware service according to an exemplary embodiment of the present invention.

FIG. 2 illustrates the outline of a context-aware service according to an exemplary embodiment of the present invention.

The context-aware service includes a recognizing phase 210 of recognizing knowledge, a determining phase 220 determining a service action using the knowledge, and a service phase 230 of executing the service action. In the recognizing phase 210, as a client object 240, one or more sensors (e.g., sensor 1, sensor 2, and sensor 3) observe knowledge. In the determining phase 220, whether a context is satisfied is determined based on the observed knowledge. In the service phase 230, as a server object 260, one or more CASs (e.g., CAS1 and CAS2) provide a service according to the content of the context. The recognizing phase 210 may be shared by a plurality of CASs and the determining phase 220 may be supported by a context-aware service framework 250 in a general manner.

The context-aware service framework 250 supports the determining phase 220 for the context-aware service and is a middleware allowing the recognizing phase 210 to be shared. In other words, the context-aware service framework 250 is a middleware for the context-aware service, which informs a CAS simultaneously satisfying a why-context and a when-context so that the CAS perform a service action and which provides a how-context to the CAS. In the context-aware service framework 250, the recognizing phase 210 can be modeled by the client object 240, i.e., a sensor, and the service phase 230 can be modeled by the server object 260, i.e., a CAS.

Figure 3:
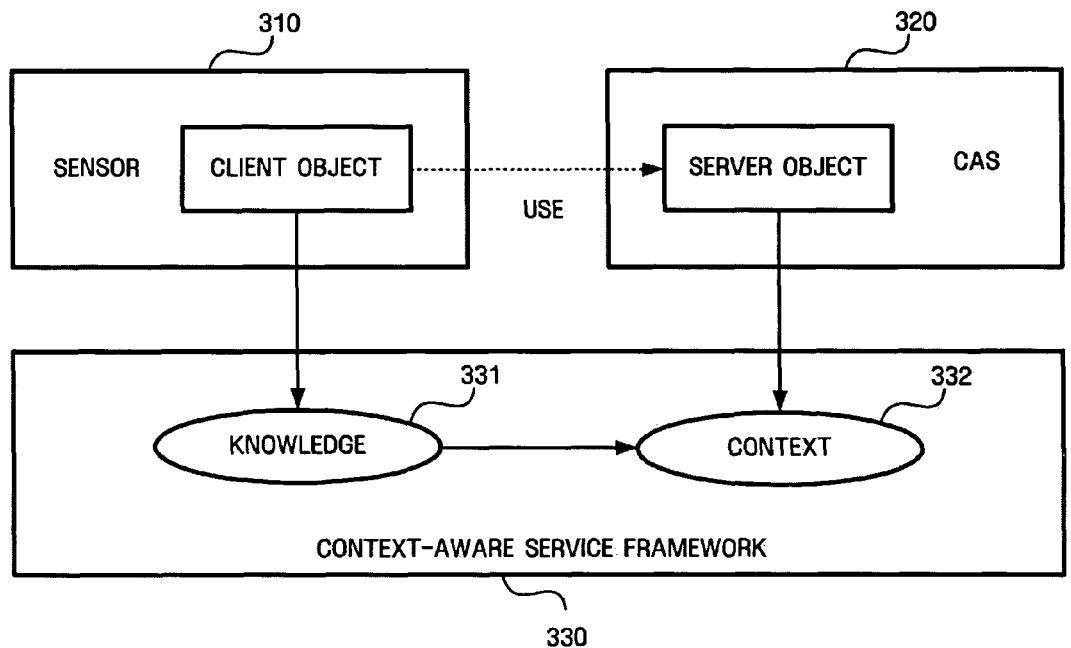
FIG. 3 illustrates the outline of a context-aware service framework according to an exemplary embodiment of the present invention.

FIG. 3 illustrates the outline of a context-aware service framework 330 according to an exemplary embodiment of the present invention.

The context-aware service framework 330 receives knowledge 331 from a sensor 310 and determines a context 332, thereby requesting a CAS 320 to provide a service. Accordingly, the sensor 310 and the CAS 320 are a client object and a server object, respectively, in an object-oriented middleware. Unlike a usual object-oriented middleware, the context-aware service framework 330 uses the server object (i.e., CAS) 320 by determining a context provided by the server object 320. In other words, the client object (i.e., sensor) 310 and the server object 320 are connected with each other through the knowledge 331 provided by the client object 310 and the context 332 requested by the server object 320. When the context 332 is determined based on the knowledge 331, the client object 310 uses the server object 320.

A context is determined based on knowledge provided by a plurality of sensors and information on an operating environment (such as common sense and a user's inclination) rather than simply based on knowledge provided by a single sensor. In other words, the sensor 310 and the CAS 320 have a loose connection in which they follow the determination made between the knowledge 331 provided by the sensor 310 and the context 332 requested by the CAS 320 by the context-aware service framework 330.

Figure 4:
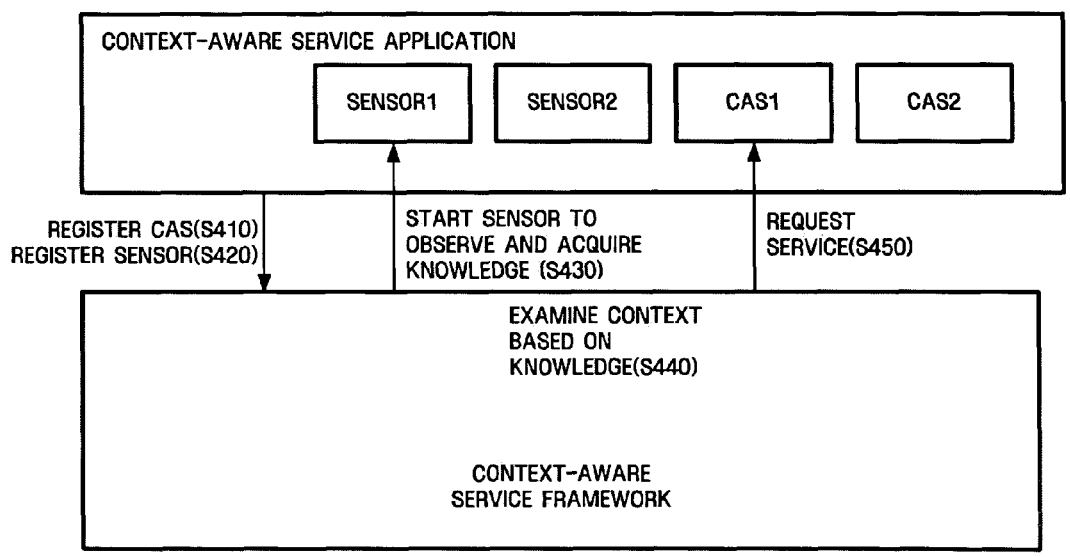
FIG. 4 illustrates the order in which a context-aware service framework operates according to an exemplary embodiment of the present invention.

FIG. 4 illustrates the order in which a context-aware service framework operates according to an exemplary embodiment of the present invention.

A context-aware service application may comprise a CAS and a sensor. However, the context-aware service application may include a plurality of sensors or no sensors. Similarly, the context-aware service application may include a plurality of CASs or no CASs.

In operation S410, the context-aware service application registers a CAS in the context-aware service framework. Here, the context of the CAS is registered. In operation S420, the context-aware service application registers a sensor in the context-aware service framework. Here, the sensor registers knowledge that it observes. After every CAS and sensor is registered, in operation S430 the context-aware service framework starts the sensor and acquires observed knowledge. In operation S440, the context-aware service framework examines every context based on the observed knowledge. In operation S450, the context-aware service framework requests a CAS corresponding to a determined context to provide a service. As shown in FIG. 4, a CAS and a sensor are controlled by the context-aware service framework and are connected with each other through a context.

Figure 5:
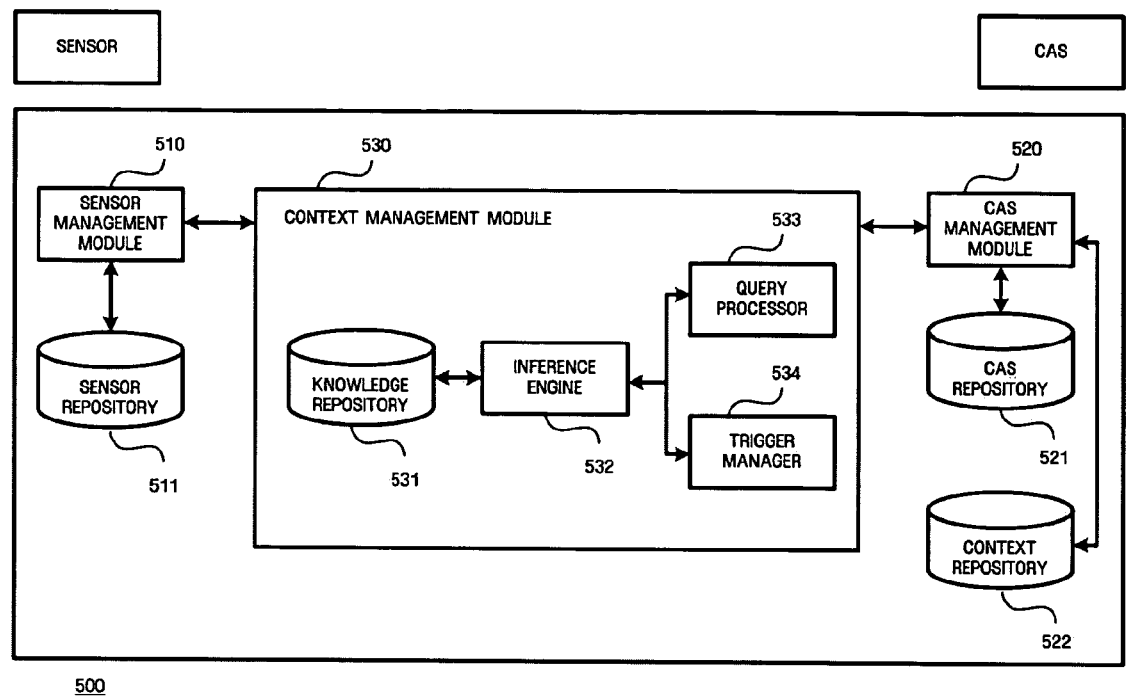
FIG. 5 illustrates the structure of an apparatus for providing a context-aware service according to an exemplary embodiment of the present invention.

FIG. 5 illustrates the structure of an apparatus 500 for providing a context-aware service according to an exemplary embodiment of the present invention.

The apparatus 500 comprises a sensor management module 510, a CAS management module 520, and a context management module 530.

In an exemplary embodiment, the term "module", as used herein, refers to, but is not limited to, a software or hardware component, such as a Field Programmable Gate Array (FPGA) or Application Specific Integrated Circuit (ASIC), which performs certain tasks. Additionally, a module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

The sensor management module 510 manages sensor information of a sensor. The sensor information includes a sensor identifier (ID), sensor state information, a communication method used by the sensor, or information on knowledge to be observed by the sensor. A sensor state may be divided into a use state in which a sensor observes knowledge and a non-use state in which the sensor waits for an observation request from a context-aware service framework. The sensor state will be described in detail with reference to FIG. 9 later. The information on knowledge to be observed by a sensor indicates information such as temperature or humidity to be observed by the sensor. The sensor information may be stored in a storage referred to as a sensor repository 511.

When a new sensor is added, the sensor management module 510 registers sensor information of the new sensor in the sensor repository 511. When a registered sensor is removed, the sensor management module 510 deletes sensor information of the removed sensor from the sensor repository 511. In addition, the sensor management module 510 changes knowledge to be observed by a sensor, sets or changes the name of a sensor, provides sensor information, or searches for a sensor corresponding to a particular condition.

The CAS management module 520 manages CAS information of a CAS and a context defined by a CAS and provides the context to the context management module 530. The CAS information includes a CAS ID, CAS state information, or a communication method used by the CAS. A CAS state may be divided into a standby state, an active state, and a service state. The CAS state will be described in detail with reference to FIG. 11 later. The information on a CAS may be stored in a storage referred to as a CAS repository 521 and the context may be stored in a storage referred to as a context repository 522.

When a new CAS is added, the CAS management module 520 registers CAS information of the new CAS and a context defined by the new CAS. When a registered CAS is removed, the CAS management module 520 deletes a context corresponding to the removed CAS and CAS information of the removed CAS.

In addition, the CAS management module 520 changes a context, sets or changes the name of a CAS, provides CAS information, or searches for a CAS corresponding to a particular condition.

The context management module 530 manages knowledge observed by a sensor based on information of a sensor which is registered in the sensor management module 510. When the knowledge which is observed satisfies a context provided by the CAS management module 520, context management module 530 informs the CAS management module 520 of a CAS corresponding to the context.

The context management module 530 includes a knowledge repository 531, an inference engine 532, a query processor 533, and a trigger manager 534. The knowledge repository 531 is a storage which stores knowledge observed by a sensor.

Upon receiving knowledge from a sensor, the context management module 530 stores the knowledge in the knowledge repository 531. As well as the knowledge provided by a sensor, information on an operating environment is stored in the knowledge repository 531. Accordingly, when the operating environment changes, the knowledge repository 531 is provided with information on the changing operating environment so that the context management module 530 can adaptively operate to the changing operating environment.

The inference engine 532 examines whether knowledge stored in the knowledge repository 531 satisfies a context provided by the CAS management module 520. An existing inference engine made public may be used as the inference engine 532. Knowledge needed when the inference engine 532 examines a context can be obtained through an operation in which the query process 533 sends a query to the knowledge repository 531. When it is determined that a why-context is satisfied at a time a when-context is satisfied as the result of the examination by the inference engine 532, the trigger manager 534 informs the CAS management module 520 of a corresponding CAS.

Figure 6:
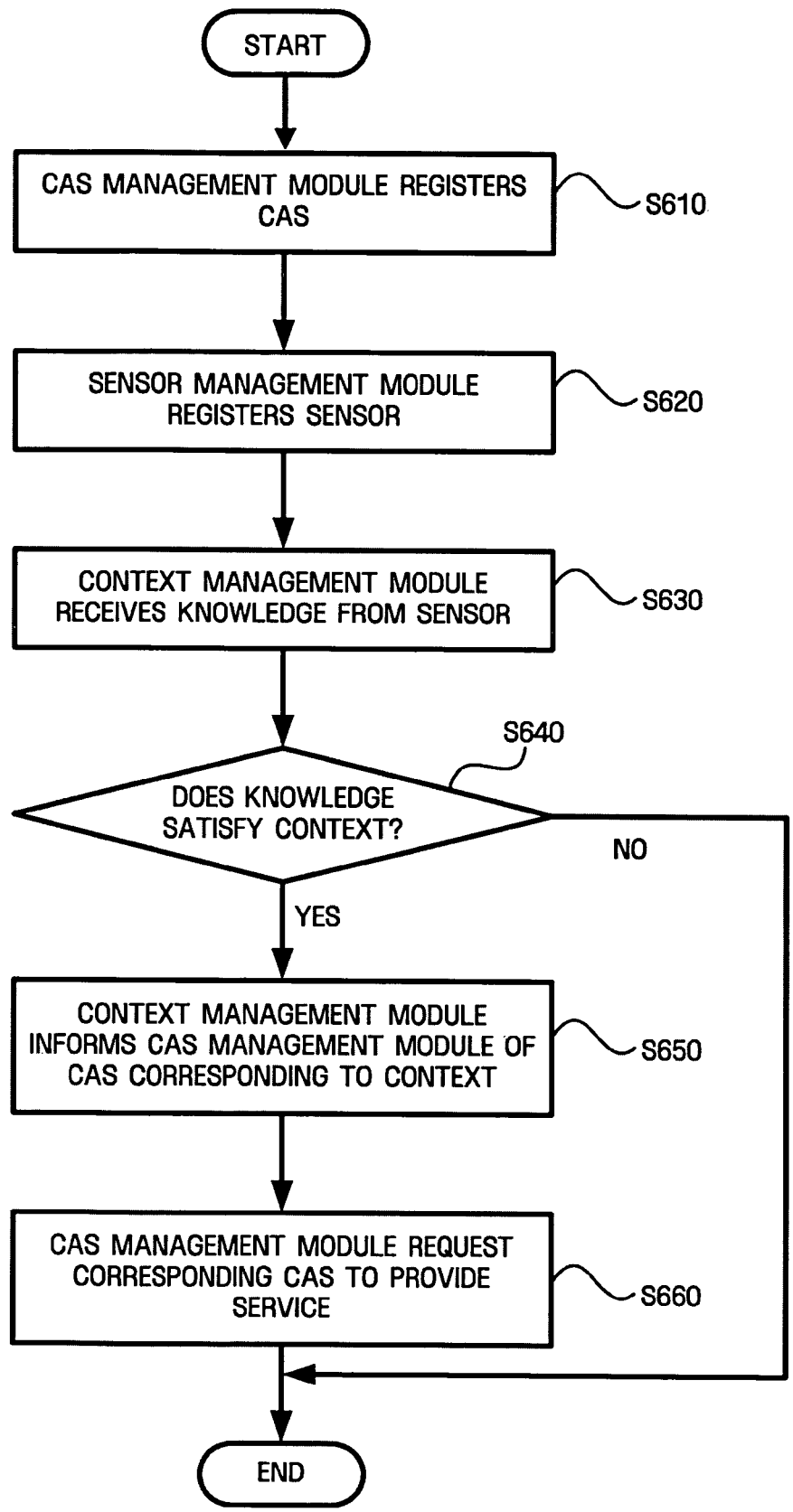
FIG. 6 is a detailed flowchart of a method of providing a service using the context-aware service framework shown in FIG. 4.

FIG. 6 is a detailed flowchart of a method of providing a service using the context-aware service framework shown in FIG. 4.

In operation S610, the CAS management module 520 registers CAS information of a CAS and a context defined by the CAS. In operation S620, the sensor management module 510 registers sensor information of a sensor. The context management module 530 receives knowledge observed by the sensor and stores the knowledge in the knowledge repository 531 in operation S630 and then determines whether the knowledge satisfies the context in operation S640. If it is determined that the knowledge satisfies the context, the context management module 530 informs the CAS management module 520 of the corresponding CAS in operation S650. The CAS management module 520 requests the corresponding CAS to provide a service in operation S660. If it is determined that the knowledge does not satisfy the context, the service providing method ends.

The method shown in FIG. 6 will now be described in more detail.

In operation S610, a CAS requests the context-aware service framework for registration, and then the CAS management module 520 registers CAS information of the CAS in the knowledge repository 531. When the CAS provides a context, the CAS management module 520 stores the context in the context repository 522.

In operation S620, a sensor requests the context-aware service framework for registration, and then the sensor management module 510 registers sensor information of the sensor in the sensor repository 511.

After the CAS and the sensor are registered, the context management module 530 receives knowledge observed by the sensor and stores the knowledge in the knowledge repository 531 in operation S630. The inference engine 532 included in the context management module 530 determines whether the knowledge satisfies the context in operation S640. The knowledge can be acquired through the query processor 533 from the knowledge repository 531. When it is determined that the knowledge satisfies the context, the trigger manager 534 included in the context management module 530 informs the CAS management module 520 of the CAS corresponding to the satisfied context in operation S650. Then, the CAS management module 520 requests the corresponding CAS to provide a service in operation S660.

When an operating environment changes, knowledge appropriate to the changing operating environment is provided to the knowledge repository 531 so that the method can be adaptively performed in response to the changing operating environment. Alternatively, a dynamic operating environment can be made using a CAS which processes knowledge. For example, let's assume that a first CAS (CAS1) is determined to provide a service according to a first context and knowledge is provided as a service result. When knowledge provided by the first CAS determines a second context requested by a second CAS, the second CAS provides a service. Accordingly, when an operating environment changes, such as a change of user, a system can be adaptive to the operating environment by changing the first CAS.

Figure 7:
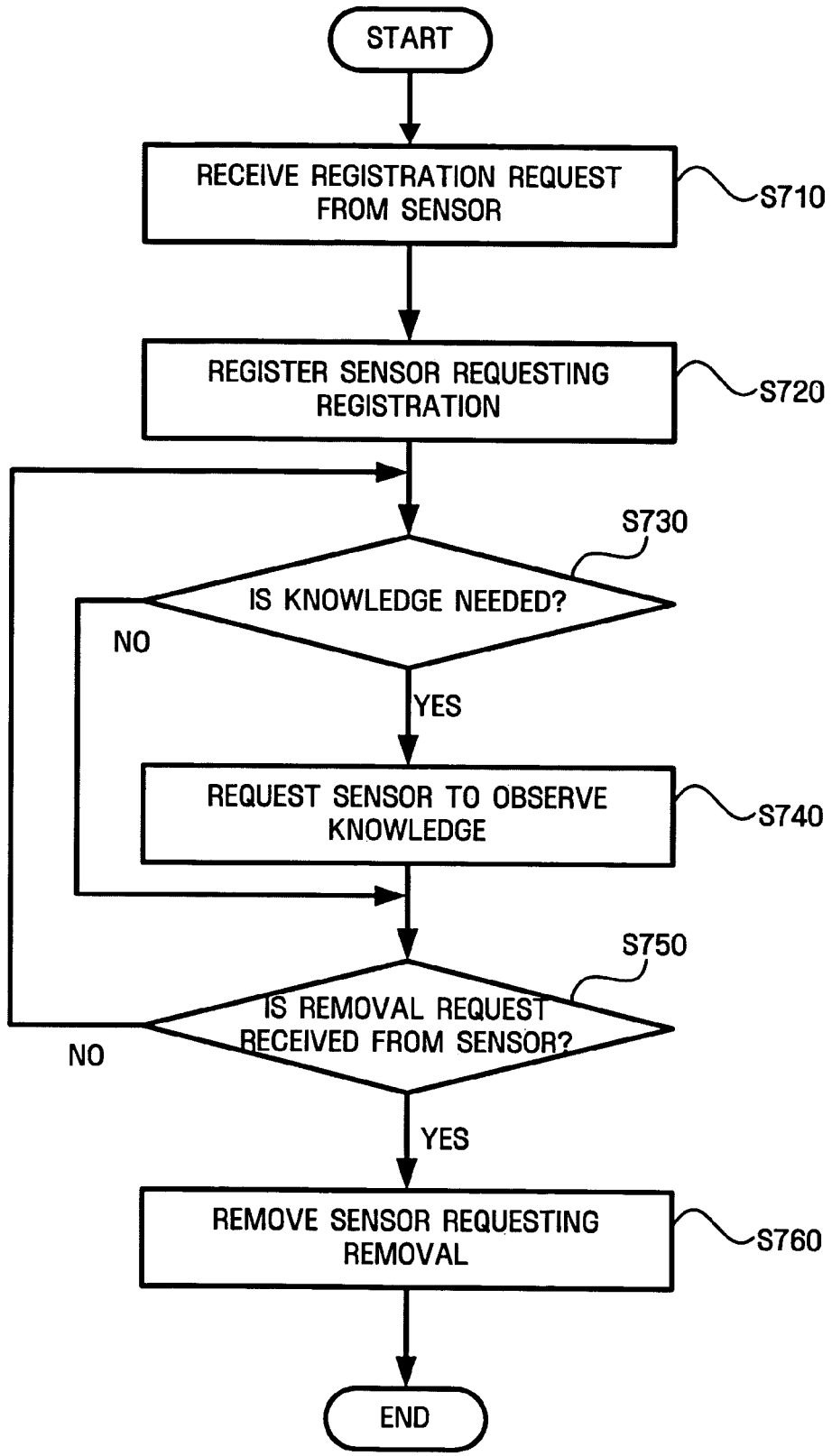
FIG. 7 is a flowchart of a method of managing a sensor using a context-aware service framework according to an exemplary embodiment of the present invention.

FIG. 7 is a flowchart of a method of managing a sensor using a context-aware service framework according to an exemplary embodiment of the present invention.

When the context-aware service framework receives a registration request from a sensor in operation S710, the sensor management module 510 registers sensor information of the sensor in the sensor repository 511 in operation S720. It is determined whether knowledge is needed to determine a context in operation S730. When it is determined that knowledge is needed, the sensor management module 510 requests the sensor to observe knowledge in operation S740. When a removal request is received from the sensor in operation S750, the sensor management module 510 removes the sensor by deleting the sensor information of the sensor from the sensor repository 511 in operation S760. When it is determined that knowledge is not needed, the sensor is kept in a non-use state until knowledge is needed as far as there is no removal request from the sensor.

Figure 8:
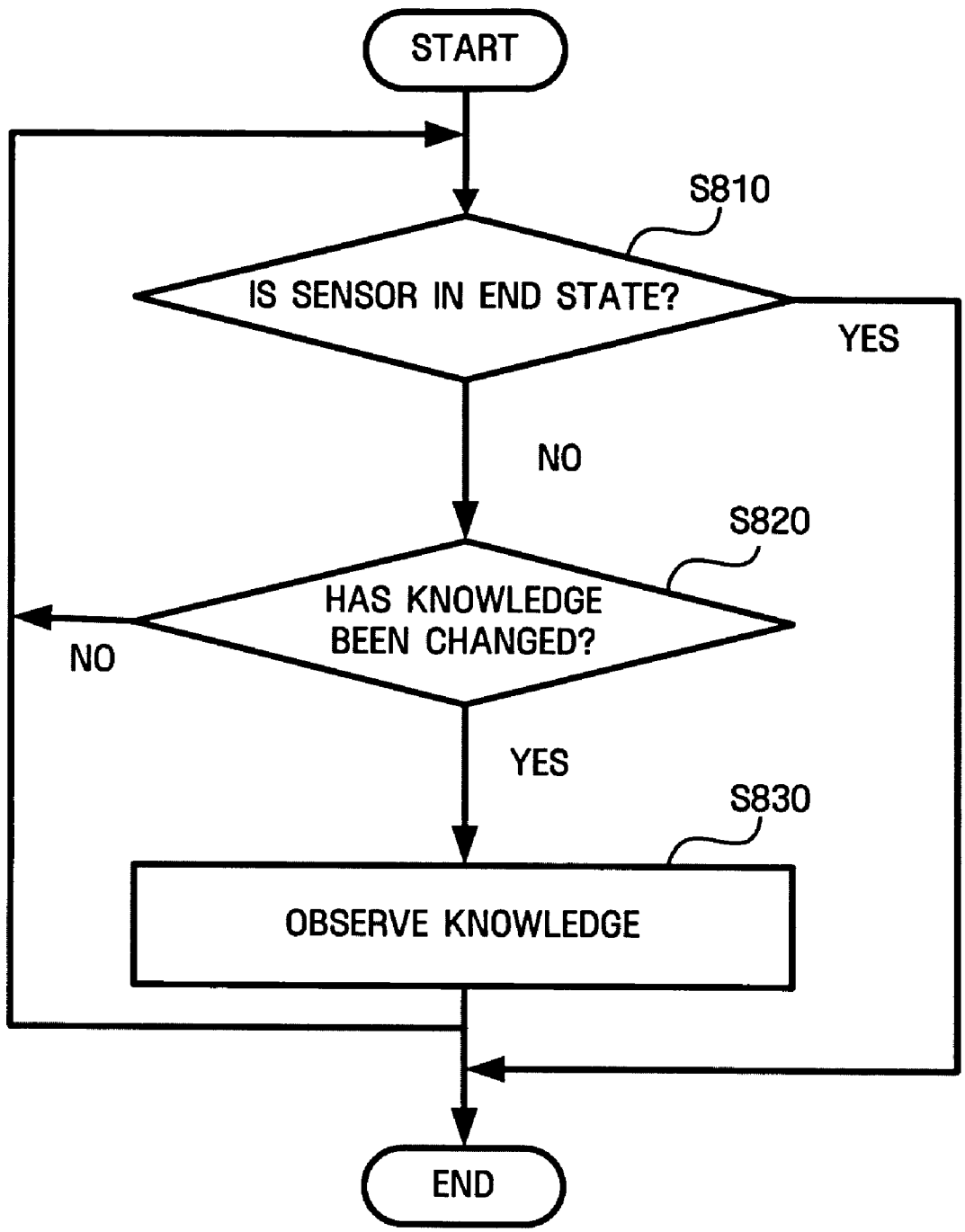
FIG. 8 is a flowchart of the operations of a sensor according to an exemplary embodiment of the present invention.

FIG. 8 is a flowchart of the operations of a sensor according to an exemplary embodiment of the present invention.

In operation S810, it is determined whether the sensor is in an end state. If it is determined that the sensor is not in the end state, it is determined whether knowledge has been changed in operation S820. If it is determined that the knowledge has been changed, the knowledge is observed in operation S830. If it is determined that the knowledge has not been changed, operation S820 is repeated until the sensor reaches the end state. The sensor continues observation until the sensor reaches the end state. Here, since determining whether knowledge has been changed (operation S820) and observing the changed knowledge (operation S830) are separately performed, efficiency of observation can be increased.

Figure 9:
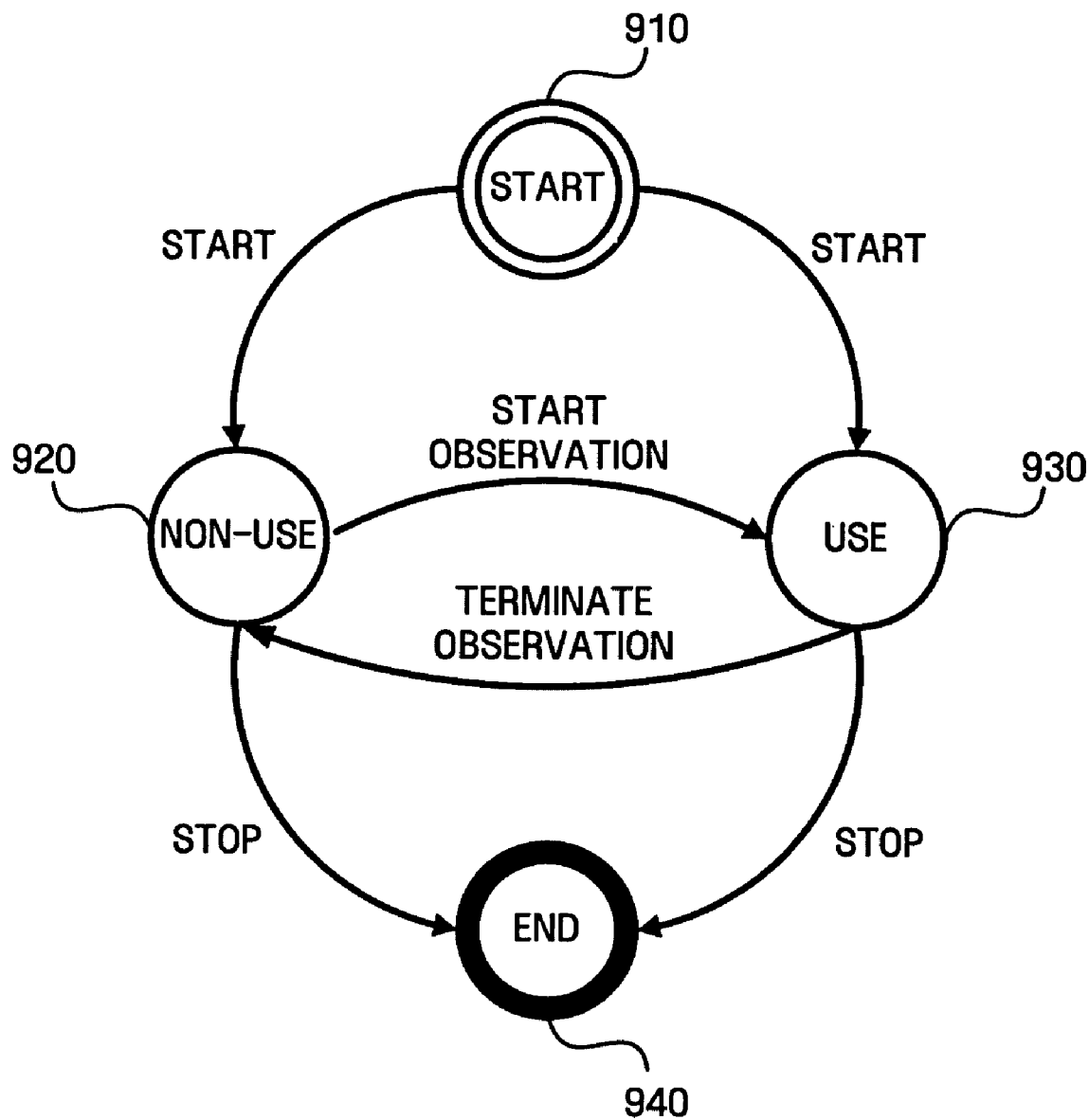
FIG. 9 illustrates the change in a sensor state according to an exemplary embodiment of the present invention.

FIG. 9 illustrates the change in a sensor state according to an exemplary embodiment of the present invention.

When a sensor starts operation at a start state 910, it reaches a non-use state 920 corresponding to a standby state before observation. When the sensor starts observing knowledge, it reaches a use state 930. When the sensor terminates observing the knowledge, it changes from the use state 930 into the non-use state 920. When the sensor starts operation and simultaneously begins observing knowledge, the sensor directly changes into the use state 930 without passing through the non-use state 920. When the sensor stops the operation, it reaches an end state 940.

Figure 10:
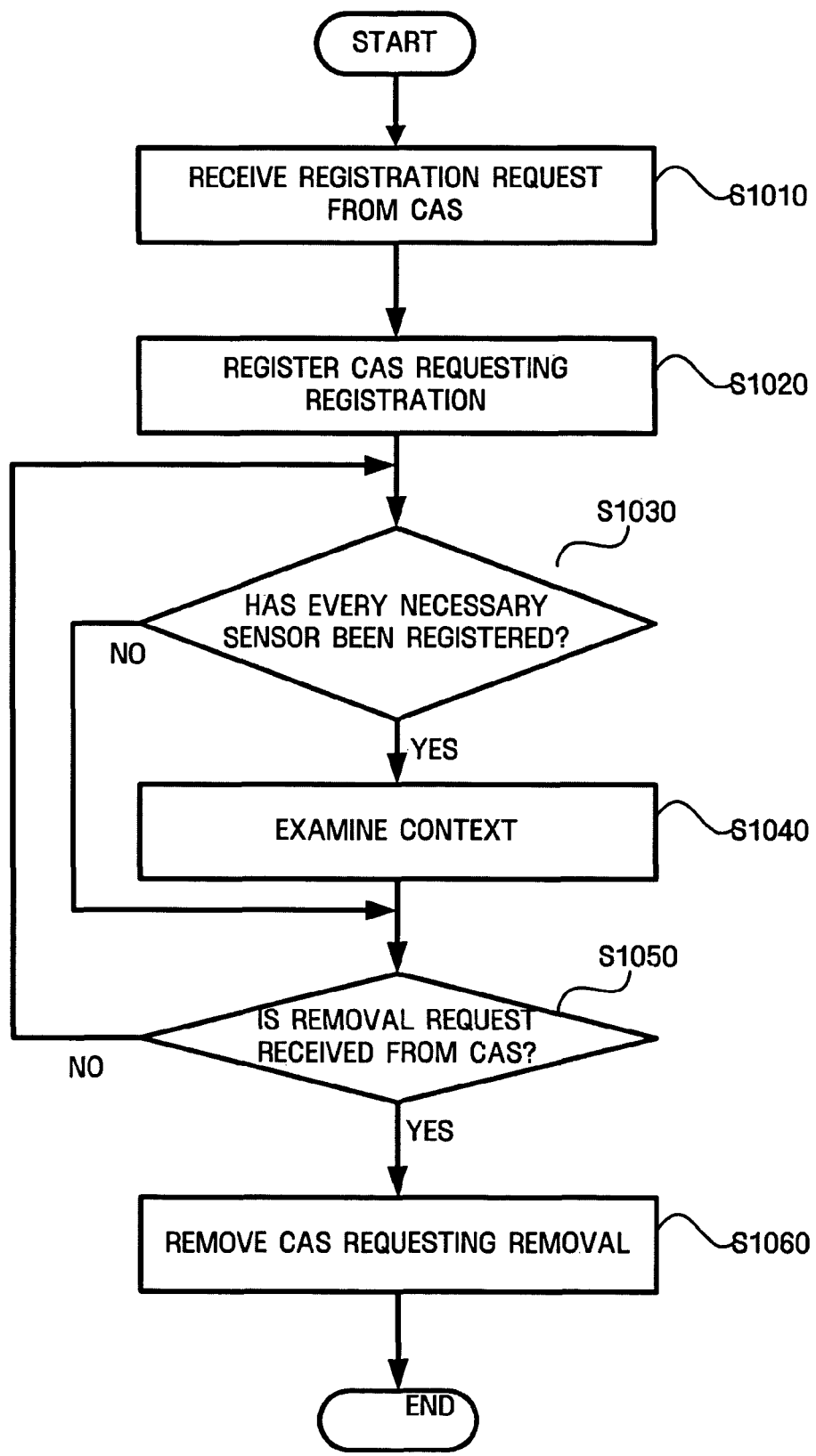
FIG. 10 is a flowchart of a method of managing a context-aware service object (referred to as a CAS) using a context-aware service framework according to an exemplary embodiment of the present invention.

FIG. 10 is a flowchart of a method of managing a CAS using a context-aware service framework according to an exemplary embodiment of the present invention.

When the context-aware service framework receives a registration request from a CAS in operation S1010, the CAS management module 520 registers CAS information of the CAS in the CAS repository 521 and a context of the CAS in the context repository 522 in operation S1020. It is determined whether every sensor that can observe knowledge needed to determine a context has been registered in operation S1030. When it is determined that every necessary sensor has been registered, the context management module 530 examines whether the knowledge satisfies the context in operation S1040. When a removal request is received from the CAS in operation S1050, the CAS management module 520 removes the CAS by deleting the context from the context repository 522 and deleting the CAS information of the CAS from the CAS repository 521 in operation S1060. When it is determined that every necessary sensor has not been registered, the CAS is kept in a standby state until every necessary sensor is registered, assuming there is no removal request from the CAS.

Figure 11:
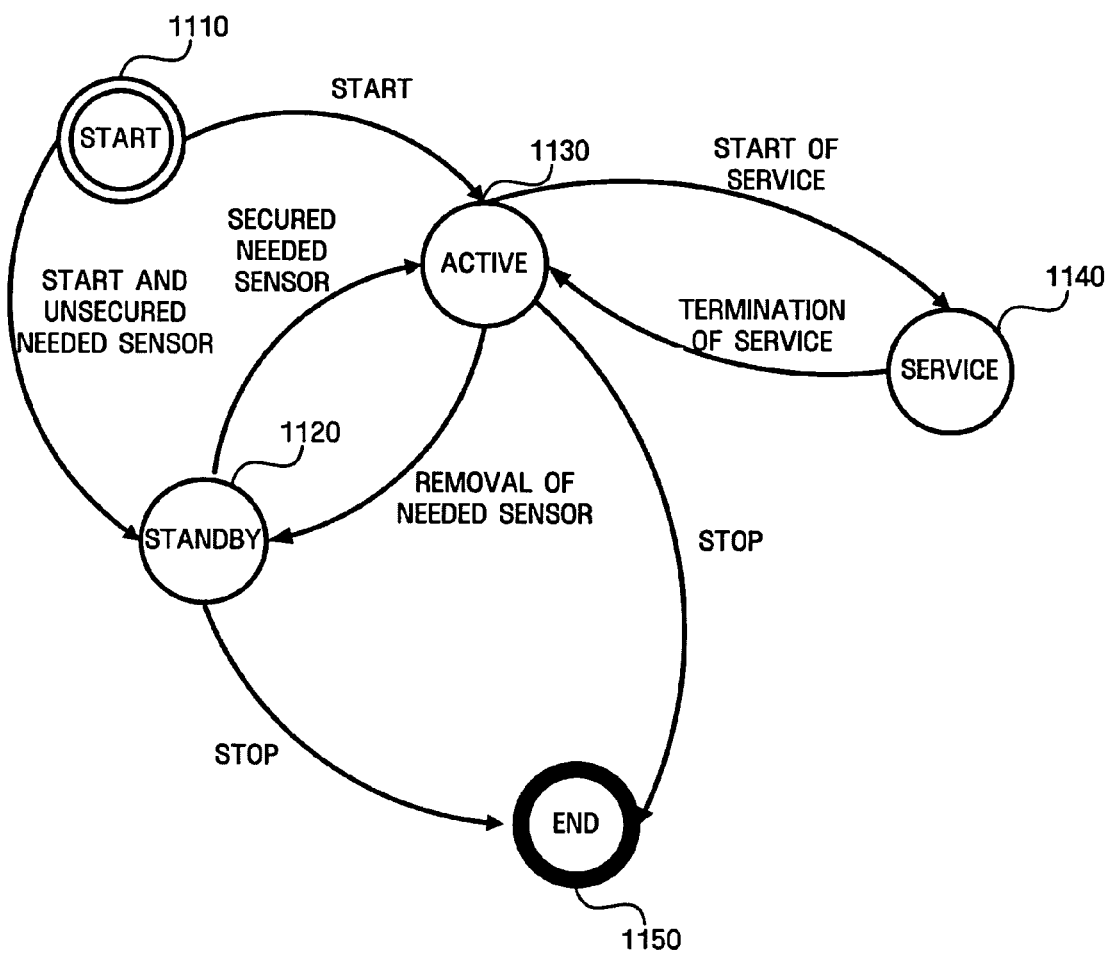
FIG. 11 illustrates the change in a CAS state according to an exemplary embodiment of the present invention.

FIG. 11 illustrates the change in a CAS state according to an exemplary embodiment of the present invention.

When a CAS starts operation in a start state 1110, it enters a standby state 1120 or an active state 1130. The standby state 1120 is a state in which the CAS has started operation but every sensor needed to examine a context has not been secured. When every sensor needed to examine the context has been registered, the CAS enters the active state 1130. However, if a sensor needed to examine the context is removed when the CAS is in the active state 1130, the CAS transitions to the standby state 1120.

When the CAS starts a service since the context is satisfied, the CAS changes from the active state 1130 into a service state 1140. When the service is terminated, the CAS returns to the active state 1130. When the CAS stops operation, it changes from the standby state 1120 or the active state 1130 into an end state 1150.

FIG. 12 illustrates an example of a source code for implementing a context-aware service framework. [75] FIG. 12 defines a context-aware service application program referred to as a "SamAirCon" including two CASs, i.e., SamCAS1 and SamCAS2, and one sensor, i.e., SamSensor1. That the when-context of the SamCAS1 is "Warm" indicates that a service of the SamCAS1, i.e., the cooling operation of an air conditioner, starts when the knowledge "Warm" changes from False to True. When the knowledge "Warm" is False the moment temperature increases above 25°, the SamCAS2 changes the knowledge "Warm" from False to True.

The SamSensor1 observes and provides the temperature as the knowledge. If the knowledge "Warm" is False when the knowledge "Temperature" is higher than 25°, the SamCAS2 changes the knowledge "Warm" from False to True. When the air conditioner is not operating the moment the knowledge "Warm" is changed into True by the SamCAS2, the Sam-CAS1 starts the air conditioner.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

The apparatus and method for providing a context-aware service of the present invention may have at least the following aspects.

First, a system which is adaptive to a dynamically changing situation can be constructed by loosely connecting a client object to a server object through the medium of context.

In addition, a plurality of client objects are allowed to share a server object by using a context, and a plurality of server objects are allowed to share a client object by sharing knowledge provided by the client object.

Moreover, a unified interface between a client object and a server object is provided.

What is claimed is:

1. An apparatus comprising:
a memory for providing a context-aware service;
a context-aware service object (CAS) management module which manages CAS information of a CAS and a context which is defined by the CAS;
a sensor management module which manages sensor information of a sensor and requests the sensor to observe knowledge; and
a context management module which is provided changed knowledge from the sensor when there is a change in the knowledge, determines whether the provided knowledge satisfies a context provided by the CAS management module, and informs the CAS management module of a CAS which defines a context which is provided by the CAS management module when the knowledge satisfies the context,
wherein the CAS management module requests the CAS to provide a service if the CAS management module is informed of the CAS by the context management module,
wherein when a new sensor is added, the sensor management module registers sensor information of the new sensor and when a new CAS is added, the CAS management module registers CAS information of the new CAS and a context defined by the new CAS, and
wherein the sensor information is allowed to be deleted in response to a removal request from the sensor, and the CAS information and the context are allowed to be deleted in response to a removal request from the CAS, and
wherein the CAS is a server object while the sensor is a client object, the context being determined based on knowledge provided by a plurality of sensors and information on an operating environment.

2. The apparatus of claim 1, wherein the context management module comprises:
a knowledge repository which stores the knowledge;
a query processor which sends a query to the knowledge repository;
an inference engine which determines whether the knowledge satisfies the context; and
a trigger processor which informs the CAS management module of the CAS according to a determination of the inference engine.

3. The apparatus of claim 1, wherein the CAS information comprises at least one of an identifier of the CAS, state information of the CAS, and information on a communication method which is used by the CAS.

4. The apparatus of claim 1, wherein the CAS information is stored in a CAS repository.

5. The apparatus of claim 1, wherein the sensor information comprises at least one of an identifier of the sensor, state information of the sensor, information on a communication method which is used by the sensor, and information on knowledge to be observed by the sensor.

6. The apparatus of claim 1, wherein the sensor information is stored in a sensor repository.

7. The apparatus of claim 1, wherein the context is stored in a context repository.

8. The apparatus according to claim 1, wherein the service is provided according to changed information in the sensor.

9. A method of providing a context-aware service, the method comprising:
registering CAS information of a context-aware service object (CAS) and a context which is defined by the CAS;
registering sensor information of a sensor;
receiving knowledge which is observed by the sensor based on the sensor information from the sensor, and receiving changed knowledge from the sensor when there is a change in the observed knowledge;
determining whether the knowledge which is received satisfies the context;
informing of the CAS which defines the context when the knowledge which is received satisfies the context; and
requesting the CAS to provide a service,
wherein when a new sensor is added, registering sensor information of the new sensor and when a new CAS is added, registering CAS information of the new CAS and a context defined by the new CAS,
wherein the sensor information is allowed to be deleted in response to a removal request from the sensor, and the CAS information and the context are allowed to be deleted in response to a removal request from the CAS, and wherein the CAS is a server object while the sensor is a client object, the context being determined based on knowledge provided by a plurality of sensors and information on an operating environment.

10. The method of claim 9, wherein the CAS information comprises at least one of an identifier of the CAS, state information of the CAS, and information on a communication method which is used by the CAS.

11. The method of claim 9, wherein the sensor information comprises at least one of an identifier of the sensor, state information of the sensor, information on a communication method which is used by the sensor, and information on knowledge to be observed by the sensor.

12. The method according to claim 9, wherein the service is provided according to changed information in the sensor.

* * * * *